US010187845B2

(12) United States Patent
Salomon et al.

(10) Patent No.: US 10,187,845 B2
(45) Date of Patent: Jan. 22, 2019

(54) WIRELESS ACCESS FOR A MOBILE TERMINAL TO FUNCTIONAL DOMAINS

(71) Applicant: Airbus Operations GmbH, Hamburg (DE)

(72) Inventors: Maxim Salomon, Hamburg (DE); Christopher Randall, Hamburg (DE); Jan Mueller, Hamburg (DE); Tim Fuss, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 24 days.

(21) Appl. No.: 14/867,460

(22) Filed: Sep. 28, 2015

(65) Prior Publication Data
US 2016/0095045 A1  Mar. 31, 2016

(30) Foreign Application Priority Data

Sep. 30, 2014  (EP) .................................... 14187043

(51) Int. Cl.
*H04W 48/04* (2009.01)
*H04W 12/08* (2009.01)
(Continued)

(52) U.S. Cl.
CPC ............. *H04W 48/04* (2013.01); *H04W 4/04* (2013.01); *H04W 4/046* (2013.01); *H04W 12/08* (2013.01);
(Continued)

(58) Field of Classification Search
CPC ... H04L 49/604; H04L 63/0227; H04L 63/10; H04L 63/0876; H04L 9/32; H04W 4/025; H04W 12/00; H04W 12/08
(Continued)

(56) References Cited

U.S. PATENT DOCUMENTS

| 6,788,935 B1 | 9/2004 | McKenna et al. |
| 7,633,909 B1 | 12/2009 | Jones et al. |

(Continued)

FOREIGN PATENT DOCUMENTS

| DE | 102012201786 | 8/2013 |
| FR | 2927210 | 8/2009 |

(Continued)

OTHER PUBLICATIONS

European Search Report, dated Dec. 5, 2014.
"Aviation data Networks: security issues and network architecture", Thanthry et al. 2004.

*Primary Examiner* — Julio R Perez
(74) *Attorney, Agent, or Firm* — Greer, Burns & Crain, Ltd.

(57) ABSTRACT

A system configured to be installed in an aircraft, the system comprising a first functional domain and a second functional domain. The first and second functional domains are configured to provide a first and service, respectively. The system further comprises a wireless access point configured to be externally managed by a controller and configured to communicate with a mobile terminal. The system comprises a controller configured to communicate with the wireless access point, the first and the second functional domains, configured to control the wireless access point and configured to control wireless access of the mobile terminal to the first and second functional domains. Further, the use of such a system in an aircraft, an aircraft comprising such a system and a method of controlling wireless access of a mobile terminal to a first functional domain and a second functional domain in an aircraft are disclosed.

15 Claims, 3 Drawing Sheets

(51) Int. Cl.
*H04W 88/12* (2009.01)
*H04W 84/12* (2009.01)
*H04W 48/20* (2009.01)
*H04W 48/02* (2009.01)
*H04W 12/06* (2009.01)
*H04L 9/00* (2006.01)
*H04W 48/18* (2009.01)
*H04W 4/04* (2009.01)

(52) U.S. Cl.
CPC ............ *H04W 48/18* (2013.01); *H04W 84/12* (2013.01); *H04W 88/12* (2013.01)

(58) Field of Classification Search
USPC ........ 455/26.1, 410, 419, 456.5, 411, 414.1; 713/166, 161, 168; 726/4, 5
See application file for complete search history.

(56) References Cited

U.S. PATENT DOCUMENTS

| | | |
|---|---|---|
| 8,037,500 B2 | 10/2011 | Margis et al. |
| 8,068,829 B2 | 11/2011 | Lemond et al. |
| 8,261,070 B2 * | 9/2012 | Angus ..................... H04L 63/10 709/223 |
| 8,315,762 B2 | 11/2012 | Correa et al. |
| 8,495,722 B1 | 7/2013 | McCusker |
| 8,565,758 B2 | 10/2013 | Owyang et al. |
| 8,719,064 B1 | 5/2014 | Heron et al. |
| 8,732,233 B2 | 5/2014 | Allen |
| 8,751,646 B1 | 6/2014 | Heron et al. |
| 8,767,537 B1 | 7/2014 | Sampigethaya |
| 9,408,178 B2 * | 8/2016 | Mayor ................. H04W 64/006 |
| 2007/0183435 A1 | 8/2007 | Kettering et al. |
| 2009/0037526 A1 | 2/2009 | Elliott et al. |
| 2009/0052386 A1 * | 2/2009 | Higashida .............. H04H 20/62 370/329 |
| 2009/0196201 A1 | 8/2009 | Ric |
| 2010/0105329 A1 | 4/2010 | Durand et al. |
| 2012/0150686 A1 | 6/2012 | Aldomar et al. |
| 2012/0192250 A1 * | 7/2012 | Rakan ................. G06F 3/03545 726/2 |
| 2015/0003357 A1 | 1/2015 | Schreiber |

FOREIGN PATENT DOCUMENTS

| | | |
|---|---|---|
| FR | 2937487 | 4/2010 |
| WO | 2009148657 | 12/2009 |
| WO | 2009152891 | 12/2009 |
| WO | 2013050875 | 4/2013 |

* cited by examiner

WIRELESS ACCESS FOR A MOBILE TERMINAL TO FUNCTIONAL DOMAINS

CROSS-REFERENCES TO RELATED APPLICATIONS

This application claims the benefit of the European patent application No. 14187043.6 filed on Sep. 30, 2015, the entire disclosures of which are incorporated herein by way of reference.

BACKGROUND OF THE INVENTION

The present disclosure generally relates to wireless access to functional domains for mobile terminals. In particular, the present disclosure inter alia relates to a system configured to be installed in an aircraft that comprises a first functional domain, the first functional domain being configured to provide a first service, and that comprises a second functional domain, the second functional domain being configured to provide a second service. Further, the present disclosure relates to the use of such a system in an aircraft, to an aircraft comprising such a system and to a method of controlling access of a mobile terminal to a first functional domain and a second functional domain in an aircraft.

Nowadays, mobile terminals having wireless communication capabilities are widely used and also the corresponding wireless networks are ubiquitous. For instance, wireless networks that provide access to data on a server, e.g., located within the Internet, are provided in homes, office buildings, public buildings, outdoor environments and vehicles. In many cases, it is crucial to design the network infrastructure so that cost, including cost for hardware components, hardware installation and maintenance, are kept low. Also, the weight of the network hardware components and the installation space required therefore are important factors, in particular in closed environments that impose restrictions on weight and installation space, e.g., in vehicles. Within a wireless network for security reasons unauthorized access to the different services has to be prevented. This applies in particular to network environments in which many mobile terminals are used that are not provided and controlled by the network operator or administrator.

US 2010/0105329 A1 and FR 2 937 487 A1 disclose a docking station for communication between a portable computer system, such as an electronic flight bag (EFB), and avionic equipment items. The docking station comprises a wide band high output wireless transceiver for carrying out a very short range point-to-point radio communication with the portable computer system and an interface connected to the avionic equipment items. Thus data originating from the portable computer system is transmitted to the avionic equipment items and data originating from the avionic equipment items is transmitted to the portable computer system through the transceiver.

US 2009/0196201 A1 and FR 2 927 210 A1 disclose a switching device in an aircraft wireless network for configuring the network from a maintenance configuration to a commercial use wherein the passengers have access to the network. The aircraft comprises a maintenance server and a cabin server. Further, a cabin access point connected to an internal antenna and an outside access point connected to two external antennas are provided. The network infrastructure additionally comprises a network switch, a radio switch and a maintenance access point. In a first configuration for commercial use, the cabin server is connected to the cabin access point and the outside access point is connected to the two external antennas. In a second configuration for maintenance use, the maintenance server is connected to the cabin access point and the maintenance access point is connected to one of the two external antennas.

An improved concept for wireless mobile terminal access to different services is desirable.

SUMMARY OF THE INVENTION

According to a first aspect, a system configured to be installed in an aircraft, the system comprising a first functional domain and a second functional domain is disclosed. The first functional domain is configured to provide a first service and the second functional domain is configured to provide a second service. The system further comprises a wireless access point configured to be externally managed by a controller and configured to communicate with a mobile terminal. The system further comprises a controller. The controller is configured to communicate with the wireless access point, the first functional domain and the second functional domain. The controller is configured to manage the wireless access point and configured to control wireless access of the mobile terminal to the first functional domain and the second functional domain.

According to a second aspect, the use of the system according to the first aspect in an aircraft, is disclosed.

According to a third aspect, an aircraft, comprising a system according to the first aspect is disclosed.

According to a fourth aspect, a method is disclosed. The method is performed in an aircraft and comprises a controller controlling wireless access of a mobile terminal to a first functional domain and a second functional domain. Therein, the first functional domain is configured to provide a first service and the second functional domain is configured to provide a second service. The controller is configured to communicate with a wireless access point, the first functional domain and the second functional domain. The controller is configured to manage the wireless access point. The wireless access point is configured to be externally managed by the controller and configured to communicate with the mobile terminal.

For the sake of conciseness, in the following description focus is put on providing further details on various implementations of the first aspect of the present disclosure. However, the information given with regard to the first aspect applies analogously to the second aspect, the third aspect and the fourth aspect.

As in the system according to the first aspect the controller controls wireless access of the mobile terminal to the first functional domain and the second functional, both the first and the second functional domain may be accessed via the same controller. Thus, a centralized entry point to the first and second functional domains is provided. Consequently, costs may be saved as further hardware components physically realizing two separate entry points to the first functional domain and the second functional domain do not have to be supplied. A central entry point may also facilitate network maintenance, reduce the required cabling and reduce installation space requirements, the latter being potentially particularly useful in closed environments such as vehicles or the like. Compared to a scenario in which separate networks are provided to isolate access to a first functional domain and a second functional domain, even the need for an entire network may be eliminated. A reduction of the number of network components or even networks may have the further advantage of reducing interference of wirelessly exchanged signals, e.g., radio frequency (RF)

signals, with each other or with signals used in other systems. Interference is often an issue in closed environments, e.g., in vehicles, and in particular in aircrafts were strict regulations may apply to the use of RF signals. If a plurality of access points is provided, the controller may be able to control the RF signals of these access points and thus be able to lower interferences between the access points. Moreover, the controller may allow using the available frequency space more effectively, e.g., by calibrating RF channels of the access points and potentially at the same time controlling an RF signal level.

The system being configured to be installed in an aircraft or actually installed in an aircraft does necessarily exclude that a functional domain may be accessed from outside the aircraft.

The controller serving as a centralized entry point to the first functional domain and the second functional domain may in addition provide security advantages as access control to both the first domain and the second is performed by a single entity. As the first service is provided in the first functional domain and the second service is provided in the second functional domain, different services are separated, thus further enhancing security. The achieved security level may allow making functional domains accessible via the controller whose functions are relevant as regards safety, for instance, safety of aircraft passengers and crew. Even if such safety relevant functional domains are made wirelessly accessible via the controller, mobile terminals may be used within the respective wireless network that are not provided and controlled by the network operator or administrator, as they may be allowed to only access another one of the functional domains intended to be accesses by these terminals. For instance, the system may thus for be employed in a scenario, where aircraft passengers are allowed to bring and use their own wireless enabled mobile terminals, a concept which is often referred to as "bring your own device" (BYOD).

With the wireless access point being an AP configured to be externally managed by a controller, hereinafter sometimes termed externally managed AP, and with the controller of the system according to the first aspect of the present disclosure being configured to manage the AP, the AP does not necessarily have to be enabled to perform certain functions that would otherwise have to be provided by it. For externally managed APs, access point management is deferred to the controller so that the APs do not act independently but are managed to a large extent or even completely by the controller. Therefore, externally managed APs may exhibit a relatively low complexity and thus often have low installation space requirements and may also be comparatively cheap. The comparatively low complexity of an externally managed AP may prove particularly useful in case of several APs being provided within the system.

The mobile terminal may be any mobile device with wireless communication capabilities. It may, for instance, be a cellular phone, for instance, a smartphone, a mobile computing device, e.g., a notebook or tablet computer, a portable gaming device, an electronic maintenance device, e.g., a maintenance computer, a measurement instrument or any personal maintenance terminal (PMAT), or an electronic flight book (EFB) in case of an aircraft environment. In the context of a BYOD scheme, mobile terminals are often termed personal electronic devices (PEDs).

In the context of the system according to the first aspect of the present disclosure, inter alia RF signals may be used for wireless communication. Among possible candidates for a wireless communication standards to be implemented in the system are, for instance, standards of the IEEE 802.11 family, i.e., wireless local area network (WLAN) standards. However, other standards may also be resorted to. For instance, communication between the mobile terminal and the wireless access point (AP) may use any of IEEE 802.11a/b/g/n/ac and 802.11w. Communication between the AP (or a plurality of APs) and the controller may, for instance, include the use of the IEEE 802.1q protocol (virtual local area network, VLAN). Protocol data units (PDUs) of a first protocol may be encapsulated using a second protocol, e.g., the generic routing encapsulation protocol (GRE).

In the context of this document, when it is stated that a first entity is configured to communicate with a second entity, this has to be understood as an indication that the second entity is configured to communicate with the first entity as well. Specifically, the mobile terminal is also configured to communicate with the AP, the AP point is configured to communicate with the controller, the first functional domain is configured to communicate with the controller and the second functional domain is configured to communicate with the controller. The communication may be bidirectional or unidirectional (either from the first to the second entity or from the second entity to the first entity) and may use packet switching. A first entity being configured to communicate with a second entity comprises both communication between these entities without any intervening component being arranged in the communication path or with one or more intervening components, e.g., routers, repeaters, gateways, relays or the like, being provided.

A functional domain may be characterized by the service or services it provides. Services sharing certain characteristics may be grouped together in one functional domain. An example of such a characteristic is a shared mobile terminal or shared group of mobile terminals that the services are provided for. Another example of such a characteristic is similar hardware and/or software resources required to render the respective services. To give but one further non-limiting example, services may be grouped based on the systems, e.g., aviation system or lighting systems, and/or parameters they affect. Each functional domain may comprise one or more hardware and/or software component. Examples thereof include servers, routers, gateways, storage devices, etc. Configuration of a functional domain to provide a service may, for instance, comprise that the functional domain comprises a server configured to provide that service. For instance, the first functional domain may comprise a first server configured to provide the first service and the second functional domain may comprise a second server configured to provide the second service. The first functional domain and/or the components comprised thereby may form a first basic service set (BSS) and the second functional domain and/or the components comprised thereby may form a second BSS.

More than two functional domains may be provided within the system according to the first aspect of the present disclosure. The controller may in this case be configured to communicate with the first functional domain, the second functional domain and with each further functional domain.

A service provided by a functional domain, i.e., a service provided by a server of the functional domain, may, for instance, be a data access service, an internet access service, an e-mail service, a control service allowing to control a hardware and/or software component, a data storage service, etc.

The wireless access point may be any wireless access point suitable for being externally managed by a controller. As an example, the wireless access point may be a so-called lightweight wireless access point (LWAP) or a controlled wireless access point (CAP) according to the control and provisioning of wireless access points (CAPWAP) protocol. The AP may, for instance, be a Wi-Fi certified AP. Likewise, the mobile terminal may be a Wi-Fi certified mobile terminal. More than one AP point configured to be externally managed by the controller and configured to communicate with the mobile terminal, wherein the controller is configured to communicate with these APs and to manage them, may be provided within the system e.g., to provide a larger network coverage area.

The controller may, for instance, comprise at least one processor and at least one memory including computer program code, the computer program code configured to control the at least one processor to perform the actions the controller is configured to perform, e.g., to communicate with the first functional domain and the second functional domain, to manage the AP and to control wireless access of the mobile terminal to the first functional domain and the second functional domain, when the computer program code is executed by the processor.

For managing the externally managed AP, for instance, in case of a LWAP the lightweight access point protocol (LWAPP) may be used. As another example, in case of a CAP, the CAPWAP may be used. Suchlike protocols are capable of controlling multiple APs at once, thus reducing configuration and maintenance effort. For access point control, a control channel may be established between the controller and the AP. Controlling the AP may, for instance, comprise that the controller provides configuration parameters and/or firmware to the AP, e.g., during a registration process of the AP.

The configuration of the controller to control wireless access of the mobile terminal to the first functional domain and the second functional domain may comprise that the controller is configured to determine if the mobile terminal has access rights allowing access to a specific functional domain and thus to the service or services thereof. If the mobile terminal has the right to access a functional domain to which it has requested access, the controller may grant the access. Otherwise, access may be denied. That the access is wireless may be considered to indicate that the communication between the mobile terminal and the AP is performed wirelessly. In this case, no cable connection of the mobile terminal is needed for communicating with any of the system components.

According to an embodiment, the controller is configured to make use of a virtual machine. By making use of a virtual machine, the controller may be provided on an existing hardware platform, e.g., a server. At the same time, a specific environment required by one or more software program components of the controller to run properly may be provided. Further, the virtual machine may provide a certain degree of isolation of the controller software from other software running on the hardware used by the virtual machine. This may further enhance security. In such an implementation, the controller may be considered as being provided in a virtualized and segregated container.

A platform or environment of the controller, e.g., a server on which software program components of the controller and potentially also an underlying virtual machine are to be executed, may be hardened. Hardening may involve the removal of unnecessary software, unnecessary usernames or logins and the disabling or removal of unnecessary services. Compared to other, non-hardened platforms or environments, the platform or environment of the controller may thus have a reduced surface of vulnerability.

According to an embodiment, the wireless access point is configured to transmit a first identifier associated with the first functional domain and a second identifier associated with the second functional domain. Having received the first and second identifier, the mobile terminal may request access to the first and second functional domain in a targeted manner by sending a targeted access request using the respective associated first or second identifier. For example, the first and second identifier may be service set identifiers (SSIDs). In this context, components of the same functional domain may form a basic service set (BSS) sharing a common basic service set identification (BSSID).

According to an embodiment, the first functional domain and the second functional domain are associated with different network partitions. Associating the first and second functional domains with different network partitions may be one way of separating the first functional domain and the second functional domain at least logically, which may be beneficial as regards security.

For instance, the different network partitions may be different network segments, different network subnets or different broadcast domains. As an example, the first functional domain and the second functional domains may be associated with different VLANs. In an exemplary scenario, the different VLANs may both be advertised by the access point by transmitting identifiers, e.g., SSIDs, associated with the functional domains and thus VLANs.

According to an embodiment, the controller is configured to control access of the mobile terminal to the first functional domain and the second functional domain based on an identity. By taking an identity into account, functional domain access control may be further refined, e.g., to allow access to services targeted to specific users, mobile terminals or groups thereof. Security may be further enhanced.

The identity may identify at least one a characteristic of the mobile terminal and a characteristic of a user of the mobile terminal. The identity may have to meet at least one criterion for the controller to grant access to a functional domain to which access has been requested by the mobile terminal. For instance, the identity may have to identify the user of the mobile terminal to be a specific person or to belong to a specific group of persons. For instance, such a group may defined by user age or nationality. In an aircraft environment, examples of such groups of persons include a passenger group, a maintenance staff group, a pilot group, a cabin crew group, a cleaning staff group and the like. Any of these groups may be further divided. The passenger group may, for instance, comprise several groups of passenger characterized by a booking class of the passenger, e.g., economy class, business class, first class and the like. A mobile terminal/user may, for instance, be associated with, i.e., assigned to, one of the above groups based information indicative of a location of the user and/or his mobile terminal (location information). As an example, in an aircraft environment a plurality of zones may be defined. For instance, at least one of the following zones may be defined: one or more passenger zones, e.g., at least one of an economy class zone, a business class zone, a first class zone; a cargo zone, a crew zone, a zone outside the aircraft and a cockpit zone. A mobile terminal/user may, for instance, be assigned to a passenger group if the user/mobile terminal is located in a passenger zone. Likewise a user/mobile terminal may be assigned to a pilot group if the location information indicates a location in a cockpit zone. Further, an association with a respective booking class may, for instance, be based on distinguishing between users/mobile terminals located in an economy class zone, a business class zone and a first class zone. A maintenance staff group may comprise different groups of staff members having different maintenance responsibilities, etc.

The identity may be conveyed to the controller as identity information. The identity information may, for instance, comprise a name, age, or a passport number of the user of the mobile terminal. Within an aircraft environment, it may also comprise the number of a seat assigned to the user or the user's booking status. The identifier may also comprise a terminal identity such as an international mobile Subscriber identity (IMSI), a mobile subscriber integrated services digital network number (MSISDN) or a serial number of the mobile terminal to give but a few further examples.

According to an embodiment, the controller is configured to perform an authentication of the identity. Security may thus be further enhanced because identity fraud is impeded.

In the authentication process, at least one of an identity of the mobile terminal and the identity of a user of the mobile terminal may be confirmed. Specifically, the controller may be configured to control access of the mobile terminal to the first functional domain and the second functional domain based on a result of an authentication process performed with respect to the identity. The result of the authentication process may, for instance, be positive, i.e., access to a functional domain to which access has been requested by the mobile terminal may be granted, if the identity is confirmed. Authentication may inter alia be performed on the basis of identity information provided to the controller. Protocols like, for instance, the extensible authentication protocol (EAP), the remote authentication dial-in user service (RADIUS) and wireless protected access (WPA) may be used in the authentication process.

According to an embodiment, the authentication takes into account an identification item. Taking an identification item into account may further enhance security.

The identification item may, for instance, be a smartcard, an identification document such as a passport or the like, a radio-frequency identification (RFID) tag, e.g., a near field communication (NFC) tag, a magnetic card, a data storage medium, such as a compact disc (CD), a digital versatile disc (DVD), a flash memory (e.g., embodied as a memory stick), a passenger ticket (in a vehicle environment), the passenger ticket, for instance, having a graphic code, e.g., a barcode or a quick response (QR) code, or any other token capable of carrying identity information. The identification item may also be an electronic certificate or the like. To configure the system to accept an identification item, one or more components may be provided to read identity information from a token or to accept an electronic certificate. For instance, a graphic code reader, a card reader, a CD and/or DVD drive or a RFID terminal may be provided. Alternatively or in addition, the component or components may be provided in the mobile terminal.

According to an embodiment, the controller is configured to perform two-factor authentication of the identity. Two-factor authentication may provide a particularly high level of security. The two-factor authentication may take into account the identification item and an additional factor, such as a user name and password combination.

According to an embodiment, the controller is configured to control access of the mobile terminal to the first functional domain and the second functional domain based on information indicative of a location of the mobile terminal. Thus, location specific access to functional domains may be realized. This may allow both providing location specific services and further enhancing security by limiting access a functional domain to mobile terminals requesting access from a specific location.

The information indicative of a location of the mobile terminal, hereinafter referred to as location information, may, for instance, be geographic location information, e.g., geographic coordinates or the like. In an aircraft environment, the location information may also comprise information indicative of a seat assigned to a user of the mobile terminal (passenger), i.e., seating location information. The seating location information may, for instance, comprise a seat row indication and an indication of a specific seat within the row or any other unambiguous seating location identifier. Likewise, the location information may comprise somewhat less precise seating location information indicative of a seat assigned to a user, e.g., a seat row indication only.

In an open environment or in a closed environment, e.g., a vehicle, different zones may be defined. The location information may indicate a location of the mobile terminal on a zone level. For instance, the location of the mobile terminal may be detected with zone granularity. Alternatively, the location may be detected more precisely and a zone the mobile terminal is located in may be derived from the detected location, e.g., one of the zones listed above.

The location information may be provided to the controller by the mobile terminal itself. For instance, the mobile terminal may be enabled to receive and process signals transmitted by a global navigation satellite system (GNSS) for determining its position. As another possibility, a user may enter location information, e.g., seating location information, into the mobile terminal. In both cases, the mobile terminal may then provide the location information to the controller. As another example, radio mapping may be used to acquire location information. For instance, the mobile terminal may obtain at least one measurement value of a radio parameter such as a received signal strength (RSS), a path loss, a timing advance (TA), a round-trip time (RTT), a propagation delay, and/or an angle of arrival (AOA). Boolean radio measurement values are also possible, e.g., a radio measurement value that indicates whether or not a specific location lies within the coverage area of a specific communication network node, e.g., an AP. The at least one measurement value may be provided from the mobile terminal to the controller. The controller may know about the position of the AP (or the position of several APs if provided) and at least some of their parameters such as signal strength, antenna characteristics and therefore coverage. With this information at hand, the controller may determine the position of the mobile terminal.

According to an embodiment, the controller is configured to control a calibration of at least one wireless communication parameter of the wireless access point. Thus, wireless network coverage may be shaped as desired. As an example, calibration may be performed so as to limit coverage to certain areas. As another option, in case of the system comprising several APs, at least one wireless communication parameter of some or all of these APs may be calibrated to reduce overlap of the coverage areas of each of the APs so that interference is reduced. A further example includes that the calibration is performed to reduce RF interference affecting other components or systems provided within the same aircraft.

The wireless communication parameter may be a wireless reception or a wireless transmission parameter. For instance, an RF transmission power of the AP may be calibrated based on mobile terminal location information. Likewise, a directional transmission and/or reception characteristic of the AP may be calibrated.

According to an embodiment, the calibration may be based on information indicative of a location of the mobile terminal. Thus, the wireless network environment may be adapted to the actual mobile terminal location or locations.

As an example, network coverage may be reduced to locations were according to the location information mobile terminals are really present by tuning at least one relevant wireless communication parameter, e.g. an RF transmission power or a directional transmission/reception characteristic. Likewise, network coverage may be limited to the inside of the aircraft and at least one specifically defined area outside the aircraft. Further, wireless communication parameter calibration may aim at improved network coverage quality at mobile terminal locations.

According to an embodiment, at least one of the first service and the second service comprises providing software applications to the mobile terminal.

Thus, depending on being allowed to the first functional domain and/or the second functional domain according to access control as performed by the controller, the mobile terminal may obtain access to the first service and/or to the second service and thus to the software application(s) provided by the respective service or services. For instance, by installing such a software application, the mobile terminal may be provided with certain capabilities. As an example, a pilot's mobile terminal may have access to a functional domain that is not accessible to a mobile terminal belonging to a passenger. For instance, special access rights may have been assigned to the pilot's mobile terminal in a registration procedure or the controller may grant access to a functional domain to the pilot's mobile terminal based on an (authenticated) identity of the pilot or the mobile terminal. The pilot's mobile terminal may thus obtain, install and use, for instance, an EFB software application provided by a service within that domain. The pilot's mobile terminal may than use the capabilities of said EFB software application, turning the pilot's mobile terminal, e.g., a computer notebook or tablet, into an EFB device. Not being able to obtain the software, a passenger's terminal has no opportunity of acquiring these capabilities.

According to an embodiment, the system is configured to enable wireless access of the mobile terminal to at least one of the first functional domain and the second functional domain from a location outside an aircraft. Thus, using the infrastructure of the system, services provided within a functional domain of an aircraft the system is installed in may be rendered to a mobile terminal located outside the aircraft. Another wireless communication infrastructure is therefore not necessarily needed to enable service rendering to a mobile terminal outside the aircraft.

That wireless access of the mobile terminal to at least one of the first functional domain and the second functional domain from a location outside an aircraft is enabled does not have to mean that access to the respective functional domain is always granted. Access grant may require at least one prerequisite to be met. For instance, access may be controlled based on an identity and/or location information.

While access to a specific one of provided functional domains from a location outside an aircraft may be enable, access to at least one other of the functional domains from outside the aircraft may not be enabled. For instance, an AP covering an area outside the aircraft may be configured to transmit a first identifier, e.g., an SSID, associated with the functional domain to which access is enabled but transmission of another identifier associated with the other, not enabled functional domain may be disabled. Only the functional domain for which an identifier is transmitted may thus be advertised to the mobile terminal outside the aircraft and thus be accessed by the mobile terminal. The other functional domain may however not be accessed from the outside location as it is not visible to the mobile terminal outside. Another AP covering an inside location, e.g., aircraft cabin, may, for instance, be configured to transmit the identifier associated with the other functional domain or with both domains. To give but one example, access to a maintenance domain from a location outside the aircraft may be enabled, e.g., for authorized maintenance staff with an according, authenticated identity. Access to a passenger entertainment services domain from an outside location may however be disabled.

According to an embodiment, the system is configured to automatically set at least one service specific of at least one of the first service and the second service based on at least one of information indicative of a location of the mobile terminal, a device type of the mobile terminal and an identity. Thus, a service rendered to the mobile terminal may be adapted to at least one of a mobile terminal location, a mobile terminal device type and an identity.

That the system is configured to set the at least one service specific automatically may comprise that the no active user action is required for setting the service specific. The device type may, for instance, be smartphone, notebook computer, tablet computer, portable gaming device, EFB, PMAT, etc. The identity may, for instance, be an identity associated with the mobile terminal or with a user of the mobile terminal.

As an example of automatically setting a service specific of a service, e.g., in case of the service being, for instance, a video streaming service, the service specific of which movie is streamed or the video resolution may be set based on location information, device type or identity. To give but one further example, in case of an internet access service, the service specific of content access rights may be set, e.g., to implement a child safety feature.

According to an embodiment, the system is at least one of configured to be installed in an aircraft and installed in an aircraft, the first functional domain and the second functional domain are chosen differently from user services and entertainment domain, an operational communication and crew domain and a control domain. All of these domains have different security levels. By employing the disclosed system, the services of these domains can be made wirelessly accessible without compromising security to a critical degree.

Other features of the present disclosure will become apparent from the following detailed description considered in conjunction with the accompanying drawings. However, the drawings are designed solely for purposes of illustration and not as a definition of the limits of the disclosure, for which reference should be made to the appended claims. The drawings are not drawn to scale. They are merely intended to conceptually illustrate the structures and procedures described herein.

DETAILED DESCRIPTION OF THE PREFERRED EMBODIMENTS

Figure 1:
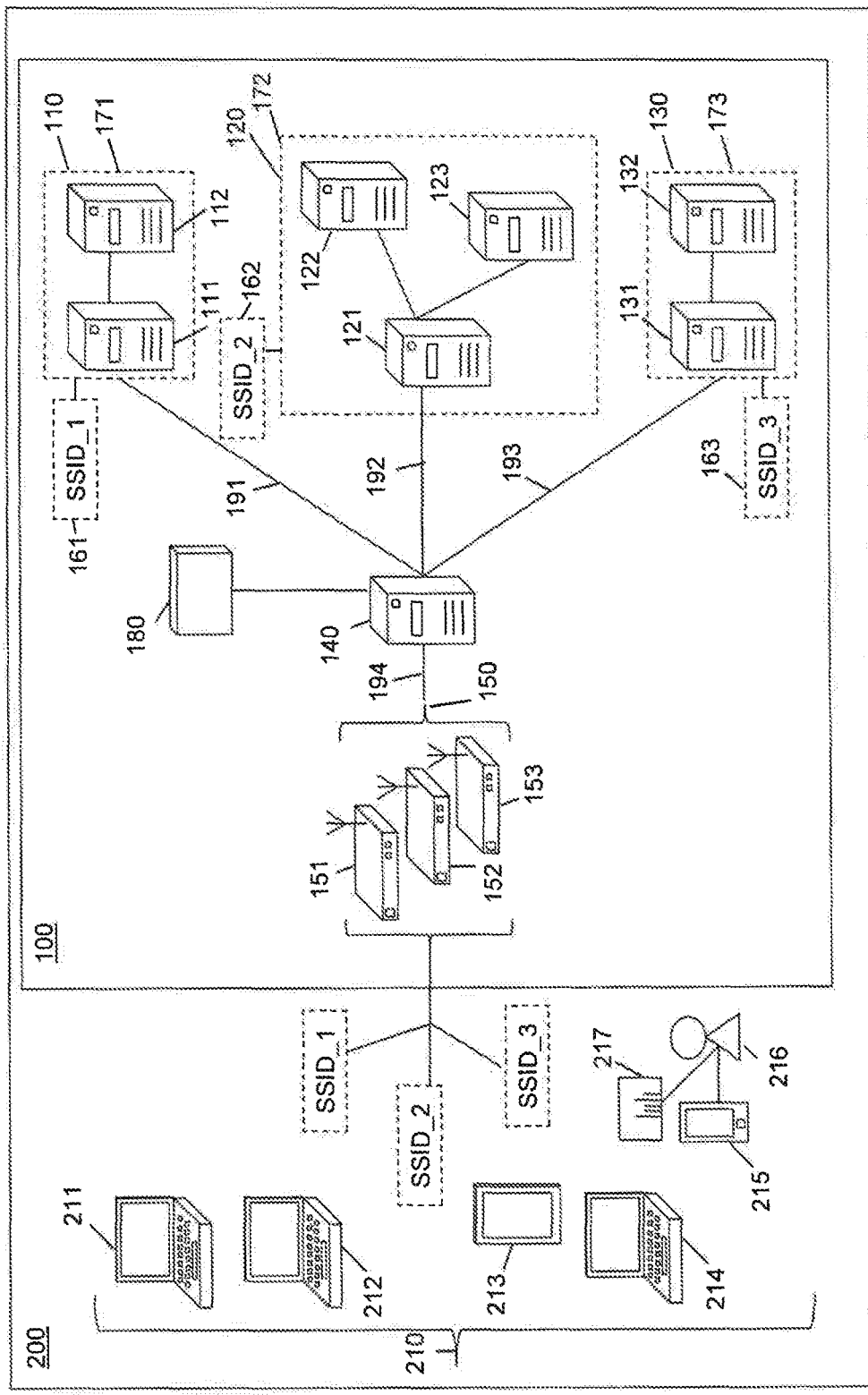
FIG. 1: a schematic illustration of an embodiment of a system 100 according to the first aspect of the present disclosure.

FIG. 1 shows a schematic illustration of an embodiment of a system 100 according to the first aspect of the present disclosure. The system 100 is provided within an aircraft 200.

The system 100 includes three functional domains 110, 120 and 130. The functional domain 110 is a control domain, the functional domain 120 is an airline an operational communication and crew domain and the functional domain 130 is a user services and entertainment domain. The domain 110 comprises a firewall 111 and a server 112. The domain 120 comprises a router 121, a component 122 and a server 123. The domain 130 comprises a router 131 and a server 132. Lines connecting entities within each functional domain 110, 120, 130 indicate communication paths between these entities. The servers 112, 123 and 132 each provide different services. They may, for instance, be application servers. The server 112 is configured to provide control services, the server 123 is configured to provide operational communication and crew services and the server 132 is configured to provide user and entertainment services, such as internet access, e-mail, video streaming, travel information, gaming application download, etc.

The entities provided within a functional domain 110, 120, 130 together form a basic service set (BSS). Thus, for instance, firewall 111 and server 112 in domain 110 form a BSS. Each BSS has a specific service set identifier (SSID) 161, 162, 163 associated therewith. Functional domains 110, 120, 130 are associated with different virtual local area networks (VLANs) 171, 172 and 173. They are thus associated with different network partitions. Consequently, functional domains 110, 120 and 130 are logically separated on a network level. The component 122 in the functional domain 120 is configured to act as a VLAN communication manager.

The system 100 further comprises wireless access points 151, 152, 153 (jointly designated 150). Wireless access points 150 are lightweight wireless access points (LWAPs). Further, a controller 140 is provided within system 100. Controller 140 is configured to manage each of LWAPs 150 and to use the lightweight access point protocol (LWAPP) to this end. As illustrated by communication paths 191, 192 and 193, controller 140 is further configured to communicate with each of functional domains 110, 120 and 130. Communication path 194 between LWAPs 150 and controller 140 include the use of the IEEE 802.1q VLAN protocol data units (PDUs) encapsulated in protocol data units of the generic routing encapsulation (GRE) protocol.

Each of LWAPPs 150 is configured to communicate wirelessly with a mobile terminal such as electronic flight book 211 (EFB), personal maintenance terminal (PMAT) 212, tablet computer 213, notebook computer 214 and smartphone 215 (jointly designated 210). In the present example, communication between mobile terminals 210 and LWAPs uses any of IEEE 802.11a/b/g/n/ac and 802.11w standards, i.e., WLAN. Tablet computer 213, notebook computer 214 and smartphone 215 belong to passengers having booked a flight on aircraft 200. Representative of users of mobile terminals 210, user 216 of smartphone 215 is shown in FIG. 1.

System 100 further comprises an NFC-terminal 180. Terminal 180 is configured to accept an identification item, in this case an NFC-token, thereby obtaining identity information. Terminal 180 is configured to forward the identity information to controller 140 for further processing. As another example of an identification item, a ticket 217 of passenger 216 having a barcode thereon is shown in FIG. 1. The barcode may, for instance, be read by one of mobile terminals 180, e.g., smartphone 215. Identity information is coded in the barcode.

LWAPs 150 are configured to transmit, e.g., broadcast, SSIDs 161, 162 and 163, thus advertising VLANs 171, 172 and 173. So as to access a service provided by any of functional domains 110, 120 and 130, mobile terminals 210 may issue corresponding service request to a respective functional domain 110, 120, 130 using the respective SSID 161, 162 or 163 and a service identifier specifically indicating a certain service provided within the respective functional domain.

Figure 2:
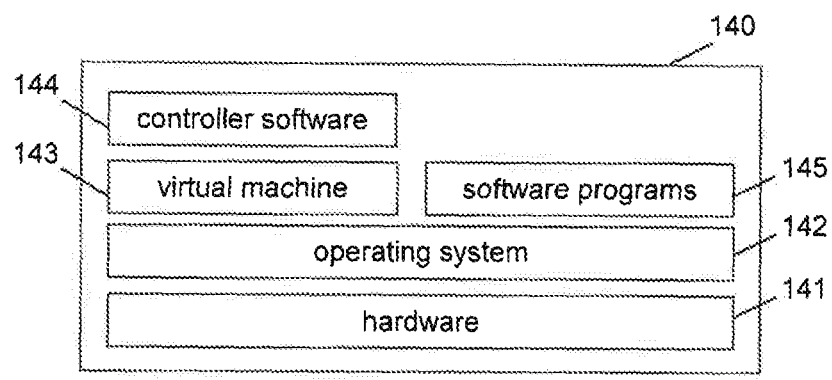
FIG. 2: a more detailed schematic illustration of a controller forming part of the system of FIG. 1.

FIG. 2 is a more detailed schematic illustration of controller 140.

Controller 140 comprises controller hardware 141. An operating system 142 is configured to run on controller hardware 141. A virtual machine 143 is configured to run on top of operating system 142 using services operating system 142 provides. A controller computer software program 144 is configured to be executed making use of virtual machine 143. The functionalities of controller 140 are thus provided in a virtualized and segregated container. On the same logical level as virtual machine 143, further computer software programs 145 may be executed using services of operating system 142 to access hardware resources 141.

By making use of virtual machine 143, the controller functionality may be provided on previously available, conventional hardware 141 while a specific environment possibly required by controller computer software program 144 to run properly may be established. Virtual machine 143 provides a certain degree of isolation of controller computer software program 144 from computer software programs 145. This enhances security even further.

Hardware 141 may, for instance, comprise at least one processor and at least one memory including computer program code of controller computer software program 144, the computer program code configured to control the at least one processor to perform the actions controller 140 is configured to perform when the computer program code is executed by the processor, e.g., to communicate with functional domains 110, 120 and 130, to manage LWAPs 150 and to control wireless access of mobile terminals 210 to functional domains 110, 120 and 130. Hardware 141 may, for instance, be embodied as a server.

A platform or environment of controller 140, e.g., at least one of operating system 142, virtual machine 143 and also computer software programs 145, may be hardened. Hardening may involve the removal of unnecessary software, unnecessary usernames or logins and the disabling or removal of unnecessary services. Thus, a reduced surface of vulnerability of controller 140 may be obtained. Controller 140 may then be termed a hardened controller.

Figure 3:
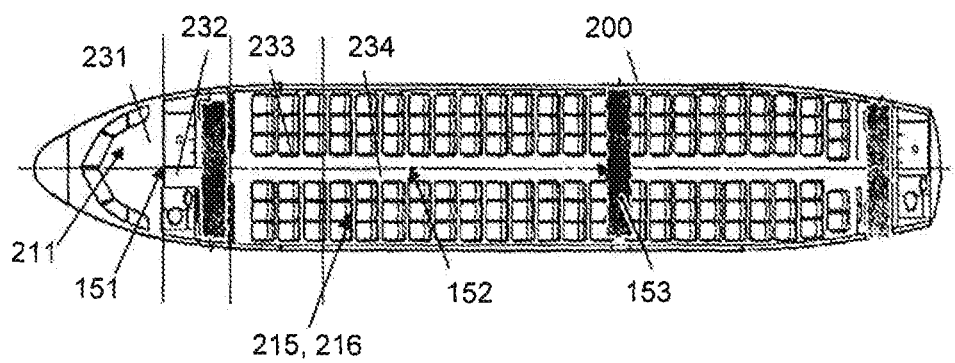
FIG. 3: a more detailed view of an aircraft comprising the system of FIG. 1.

FIG. 3 is a more detailed view of aircraft 200. As indicated by the vertical lines in FIG. 3, the cabin of aircraft 200 is divided into different zones, zone 231 is a cockpit zone, zone 232 is a crew zone, zone 233 is a business class passenger zone and zone 234 is an economy class passenger zone. In FIG. 3, an example arrangement of LWAPs 151, 152 and 153 within aircraft 200 is indicated by arrows. Also, the seat assigned to passenger 216 having smartphone 215 is indicated by an arrow. Further, the position of EFB device 211 is indicated by an arrow. For enhanced clarity, the positions of the other mobile terminals shown in FIG. 1 are not indicated.

It is noted that at least one of LWAPs 151, 152 and 153 may also provide network coverage outside of aircraft 200. Also, apart from these LWAPs another LWAP may be provided to provide outside coverage. Outside coverage may, for instance, be useful for enabling wireless access to a maintenance functional domain (not shown in FIG. 1) from an outside location, e.g., to maintenance staff members. To this end, the LWAP may be configured to transmit an identifier, e.g., SSID, associated with the maintenance domain. Transmission of SSIDs 161, 162 and 163 may however be disabled for this LWAP so as not to allow access to functional domains 110, 120 and 130 from outside aircraft 200.

Figure 4:
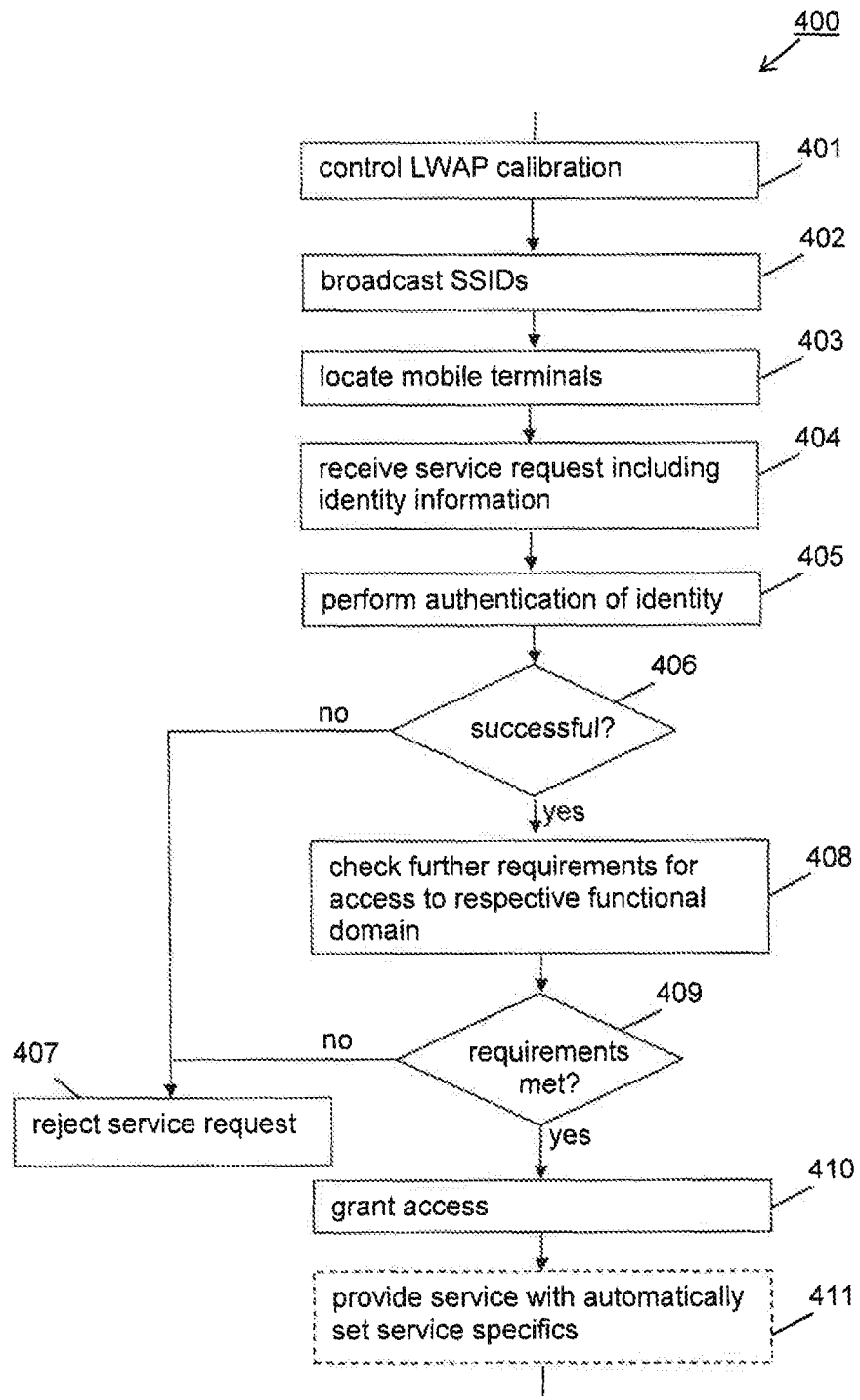
FIG. 4: a flow chart schematically illustrating an embodiment of a method according to the fourth aspect of the present disclosure, the method being performed by the controller of FIG. 2 in the environment of the aircraft and the system illustrated in FIG. 1 to FIG. 3.

FIG. 4 is a flow chart 400 schematically illustrating an embodiment of a method according to the fourth aspect of the present disclosure, the method being performed by controller 140 in the environment of the aircraft 200 and the system 100.

As shown in flow chart 400, in a first step 401 controller 150 controls calibration of the RF transmission power and directional transmission characteristics of LWAPs 150. To this end, the controller 150 communicates with LWAPs 150 via communication path 194. This calibration of wireless communication parameters of LWAPs 150 adapts the coverage of LWAPs 150 to the environment of the cabin of aircraft 200, thus yielding high quality coverage and at the same reduced interference of LWAPs 150 with each other and with other systems and components provided within aircraft 200.

Next in step 402, LWAPs broadcast the SSIDs of VLANs 171, 172 and 173 associated with functional domains 110, 120 and 130, respectively.

Subsequently, in step 403, the positions of mobile terminals 210 are located. To this end, mobile terminals 210 measure values of radio parameters such as received signal strength (RSS), etc. of the LWAPs 150 by which their respective positions are covered. The radio measurement values are then provided to controller 150. With the information on the LWAPs 150 available to controller 150, controller 150 is able to derive information indicative on the respective locations of mobile terminals 210 within aircraft 200 (location information). As will be explained below, alternatively or in addition, the location information may also be determined at a later stage.

In step 404, controller 140 receives a service request issued by one of mobile terminals 210. With the service request, the respective mobile terminal requests provision of one of the services provided within functional domains 110, 120, 130. The service request comprises a service identifier and the SSID of the respective functional domain as well as identity information. The service request is conveyed to controller 140 via a respective LWAP of LWAPs 150 covering the location of the mobile terminal and via communication path 194.

The identity information is associated with the mobile terminal that has issued the service request and with its owner/user. As an example, the identity information is provided on ticket 217 of user 216, specifically coded in the barcode thereon. User 217 may use barcode reading capabilities of smartphone 215 to obtain the identity information for forwarding to controller 140. As another example, identity information may be provided on an NFC token, e.g., belonging to a pilot of aircraft 200. The NFC token may either be read by one of mobile terminals 210, e.g., EFB device 211, or by NFC terminal 180. The identity information may also be provided within a respective one of mobile terminals 210, e.g., in form of a certificate, so that no reading thereof is required. In an embodiment, location information for the mobile terminal may be obtained together with the identity information. As an example, the location information may, for instance, be provided as seating location information, may e.g., be coded in the barcode on ticket 217 and may be read together with the identity information using the barcode reading capabilities of smartphone 215 for subsequent provision to controller 140 when mobile terminal 215 issues a service request.

Having executed step 404, in step 405, controller 140 performs an authentication of the identity conveyed by the identity information, thus taking into account the respective identification item previously used to obtain the identity information. Protocols like the extensible authentication protocol (EAP), the remote authentication dial-in user service (RADIUS) and wireless protected access (WPA) may be used in the context of the authentication process. Authentication step 405 may also include obtaining location information, e.g., if the location of a mobile terminal having issued a service request is a factor considered in the authentication process. Also, location information may be obtained after successful authentication, e.g., if location information is not considered in the authentication process itself but rather, for instance, a location indicated by the location information has to meet a certain criterion as an additional, later checked condition for functional domain/service access as will be described below with respect to step 408.

In step 406 it is then checked if authentication has been successful. If not, the control flow branches to step 407 which comprises rejection of the service request. However, in the affirmative case it is progressed to step 408.

Step 408 comprises checking further requirements so to be able to determine if the respective functional domain may be accessed. Therein, several factors are taken into account. For instance, information indicative of a location of the mobile terminal that has issued the service request is considered. As an example, EFB device 211 may only access functional aircraft information services domain 120 and the services provided therein if EFB device 211 is located in cockpit zone 231 (see FIG. 3). Access to entertainment services provided within functional domain 130 may only be permitted for mobile terminals located in one of zones 233 or 234 but not, for instance, if a requesting mobile terminal is located in another zone or outside aircraft 200. Further examples of factors that may be considered may comprises the age of a user of the requesting mobile terminal as indicated by the identity information, payment information for functional domains and/or services to which access is subject to costs, a device type of the requesting mobile terminal, etc.

In step 409, it is then determined if the further requirements are met. If not, the control flow branches to step 407 and the service request is rejected. However, in the affirmative case it is progressed to step 410 and access to the respective functional domain is granted.

The block of step 411 is shown with dashed outlines because it is not performed by controller 140 but rather in the respective functional domain. Step 411 comprises providing the requested service with automatically set service specifics, the service specifics being set based on at least one of information indicative of a location of the mobile terminal a device type of the requesting mobile terminal and an identity.

Thus, a service rendered to the mobile terminal is adapted to at least one of a mobile terminal location, a mobile terminal device type and an identity. As an example of automatically setting a service specific of a service, e.g., in case of the service being an internet access service the location of the requesting mobile terminal may determine the maximum data transfer rate. For instance, for passengers and their mobile terminals located within business class zone 233, the maximum data transfer rate may be higher than for a location within economy class zone 234 in which smartphone 215 is located (see FIG. 3). In particular if not already available, e.g., because it is needed for steps executed earlier, location information may be determined prior to the execution of step 411 or in the context of step 411. In case of the service being a video streaming service, for instance, a resolution of the streamed video content may be set based on the device type. For smartphone 215 the resolution may be set to a smaller value than for notebook computer 214. Also, the passenger's identity may be used to set the actual video content. If, for instance, according to identity information a respective passenger is a child, video content suitable for children may be streamed.

According to the above described embodiments, wireless access to functional domains 110, 120 and 130 is provided in an efficient manner. As lightweight access points 150 are used that are managed by controller 140, network administration and maintenance are relatively simple and cost savings may be attained. Good network coverage within the cabin of aircraft 200 may still be provided. Calibration of the LWAPs also contributes to good coverage and further reduces interference. Having controller 140 act as a central entry point to functional domains 110, 120 and 130, comparatively few cabling work is needed to install system 100 in aircraft 200. Central control of access to functional domains 110, 120 and 130 moreover enhances security. So do the design of controller 140, inter alia due to the use of virtual machine 143, authentication and separation of services provided by using functional domains associated with different VLANs. The high security level allows for having just one network connecting all of the functional domains.

All presented embodiments are only examples. Any feature presented for a certain embodiment may be used with any aspect of the disclosure on its own or in combination with any feature presented for the same or another example embodiment and/or in combination with any other feature not mentioned. Any feature presented for an example embodiment in a certain category may also be used in a corresponding manner in an example embodiment of any other category.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system installed in an aircraft, the system comprising:
a first functional domain providing a first service;
a second functional domain providing a second service;
a wireless access point managed by a controller and configured to communicate with a mobile terminal; and
the controller configured to communicate with the wireless access point, the first functional domain and the second functional domain, the controller further configured to manage the wireless access point and to control granting wireless access of the mobile terminal to the first functional domain and the second functional domain,
wherein the controller further controls granting access of the mobile terminal to the first functional domain and the second functional domain based at least on a two-factor authentication of an identity of the,
the mobile terminal or of an identity of a user of the mobile terminal, wherein the two-factor authentication takes into account an identification item by at least one of reading identity information from a token or accepting an electronic certificate, and further takes into account at least one of a location of the mobile terminal or a user name and password combination.

2. The system according to claim 1, wherein the controller is configured to make use of a virtual machine.

3. The system according to claim 1, wherein the wireless access point is configured to transmit a first identifier associated with the first functional domain and a second identifier associated with the second functional domain.

4. The system according to claim 1, wherein the first functional domain and the second functional domain are associated with different network partitions.

5. The system according to claim 1, wherein the controller is further configured to control granting access of the mobile terminal to the first functional domain and the second functional domain based on the identity of the user of the mobile terminal.

6. The system according to claim 5, wherein the controller is configured to perform an authentication of the identity of the mobile terminal.

7. The system according to claim 1, wherein the controller is at least one of configured to control granting access of the mobile terminal to the first functional domain and the second functional domain based on information indicative of a location of the mobile terminal; and configured to control a calibration of at least one wireless communication parameter of the wireless access point.

8. The system according to claim 7, wherein the controller is configured to use the information indicative of the location of the mobile terminal to determine whether to grant access to the mobile terminal.

9. The system according to claim 1, wherein the controller is configured to enable wireless access of the mobile terminal to at least one of the first functional domain and the second functional domain from a location outside an aircraft.

10. The system according to claim 1, wherein the controller is configured to automatically set at least one service specific of at least one of the first service and the second service based on at least one of information indicative of a location of the mobile terminal, a device type of the mobile terminal and an identity.

11. The system according to claim 1, wherein the system is installed in an aircraft.

12. The system according to claim 1, wherein the first functional domain and the second functional domain are chosen differently from a user services and entertainment domain, an operational communication and crew domain and a control domain.

13. The system according to claim 1, wherein the system is located in an aircraft.

14. An aircraft comprising:
a system installed in the aircraft, the system comprising:
a first functional domain providing a first service;
a second functional domain providing a second service;
a lightweight wireless access point (LWAP) managed by a controller and configured to communicate with a mobile terminal; and
the controller configured to communicate with and control operation of the wireless access point, the first functional domain and the second functional domain, the controller further configured to manage the wireless access point and to control granting of wireless access of the mobile terminal to the first functional domain and the second functional domain;
wherein the controller further controls granting access of the mobile terminal to the first functional domain and the second functional domain based at least on a two-factor authentication of an identity of the mobile terminal or of an identity of a user of the mobile terminal, wherein the two-factor authentication takes into account an identification item by at least one of reading identity information from a token or accepting an electronic certificate, and further takes into account at least one of a location of the mobile terminal or a user name and password combination.

15. A method performed in an aircraft, comprising the steps:
controlling, with a controller, wireless access of a mobile terminal to a first functional domain and a second functional domain, the first functional domain providing a first service and the second functional domain providing a second service,
communicating, with the controller, with a wireless access point, the first functional domain and the second functional domain, and
managing, with the controller, the wireless access point, wherein the wireless access point is managed by the controller and communicates with the mobile terminal,
controlling, with the controller, granting wireless access of the mobile terminal to the first functional domain and the second functional domain based at least on a two-factor authentication of an identity of the,
mobile terminal or of an identity of a user of the mobile terminal, wherein the two-factor authentication takes into account an identification item by at least one of reading identity information from a token or accepting an electronic certificate, and further takes into account at least one of a location of the mobile terminal or a user name and password combination.

* * * * *